United States Patent
Scholtysik et al.

(10) Patent No.: US 6,695,249 B2
(45) Date of Patent: Feb. 24, 2004

(54) HUB FOR INFORMATION MEDIA IN STRIP OR TAPE FORM

(75) Inventors: Bernd Scholtysik, Munich (DE); Ludwig Zeroni, Ottobrunn (DE)

(73) Assignee: EMTEC Magnetics GmbH, Ludwigshafen (DE)

( * ) Notice: Subject to any disclaimer, the term of this patent is extended or adjusted under 35 U.S.C. 154(b) by 0 days.

(21) Appl. No.: 10/011,414

(22) Filed: Dec. 11, 2001

(65) Prior Publication Data

US 2002/0074451 A1 Jun. 20, 2002

(30) Foreign Application Priority Data

Dec. 20, 2000 (DE) ........................... 200 21 553 U

(51) Int. Cl.$^7$ ............................................. B65H 75/08
(52) U.S. Cl. ........................... 242/613.4; 242/610.6
(58) Field of Search ...................... 242/610.6, 612, 242/613, 613.1, 613.2, 613.4, 613.5, 609.4, 118.2, 118.31, 118.32, 118.41, 571.4, 571.5, 611.2

(56) References Cited

U.S. PATENT DOCUMENTS

| | | | | |
|---|---|---|---|---|
| 3,056,563 A | * | 10/1962 | Whitnah | 242/613.4 |
| 3,627,221 A | * | 12/1971 | Nichols et al. | 242/613.5 |
| 4,083,509 A | * | 4/1978 | Vasudeva et al. | 242/613.4 |
| 6,047,921 A | * | 4/2000 | Liepold et al. | 242/610.6 |
| 6,405,974 B1 | * | 6/2002 | Herrington | 242/610.6 |

FOREIGN PATENT DOCUMENTS

| CA | 2112654 | 7/1995 |
|---|---|---|
| DE | 9400220 | 4/1994 |
| DE | 20021553 | 4/2001 |

OTHER PUBLICATIONS

English Language Abstract of DE 200 21 553.

* cited by examiner

*Primary Examiner*—William A. Rivera
(74) *Attorney, Agent, or Firm*—Greenblum & Bernstein, P.L.C.

(57) ABSTRACT

Hub for information media, the hub comprising an outer winding area having a width, a central bore and a center point located on the hub, driving grooves on a circumference of the hub, an outer ring, an inner ring, and a connector for connecting the outer ring with the inner ring. The width of the outer winding area of the hub is at least equal to a width of the information medium. The connector comprises diagonal ribs running diagonally at a slant in an axial direction and sloping alternately in accordance with two axial directions of the hub and in neighboring segments, wherein respective pairs of neighboring diagonal ribs are sloped in different directions and have a further rib between them.

17 Claims, 3 Drawing Sheets

Fig. 1
Fig. 2
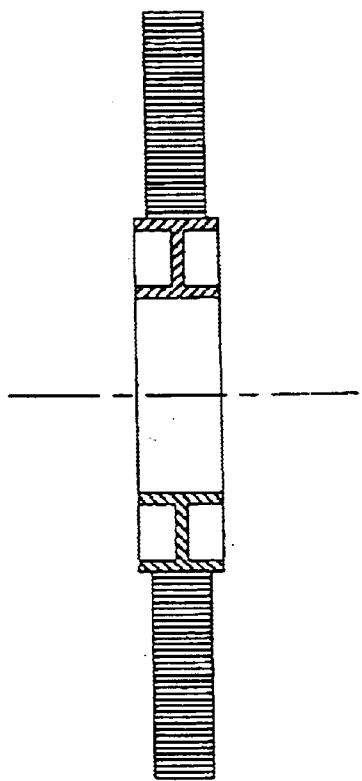
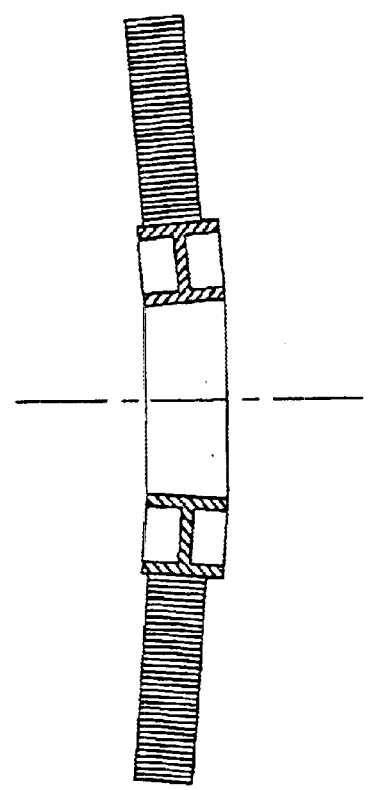

Fig. 3
(Prior Art)
Fig. 3a
(Prior Art)
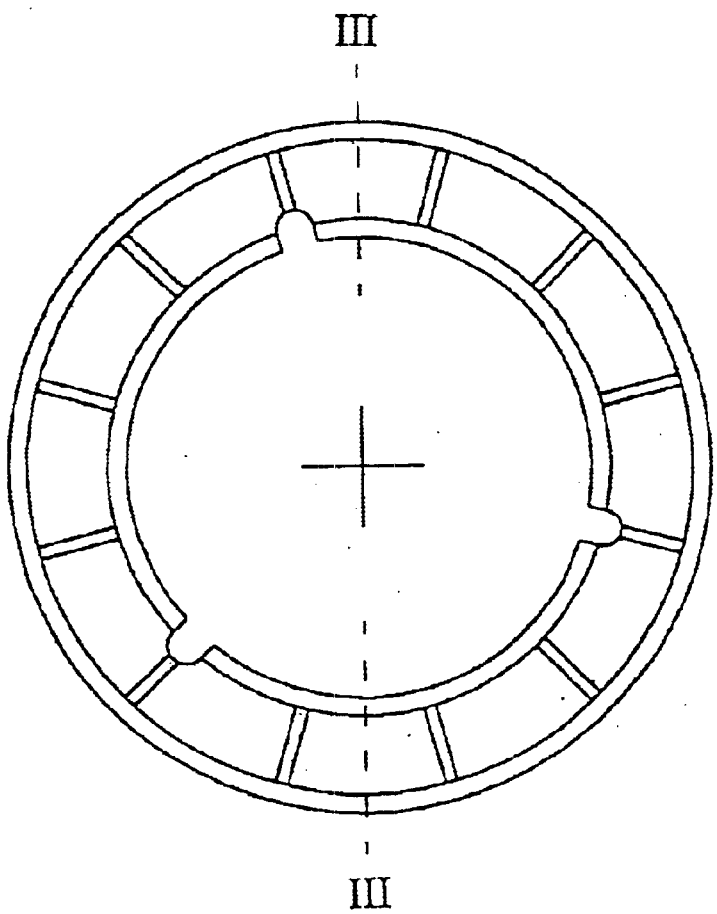
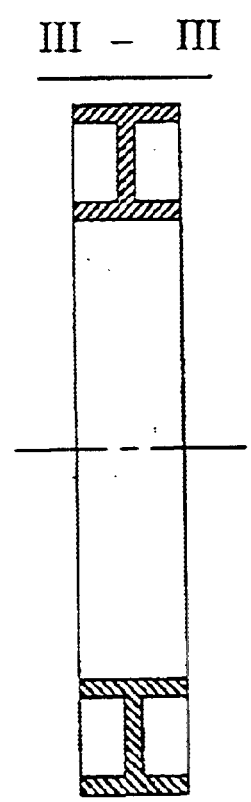

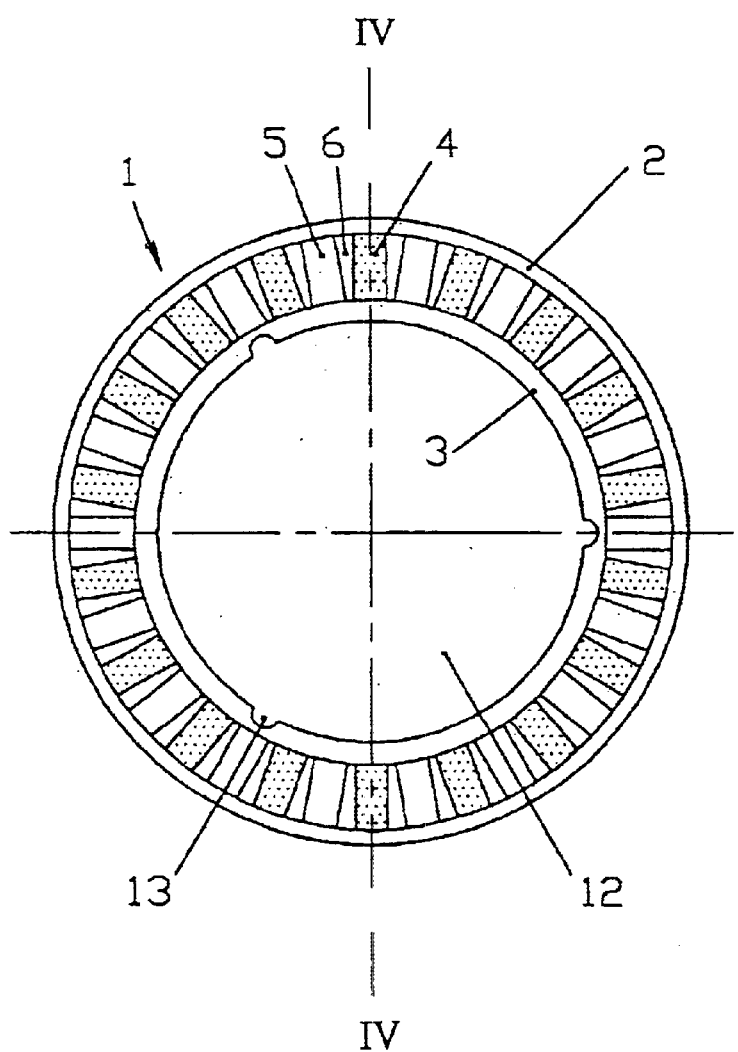
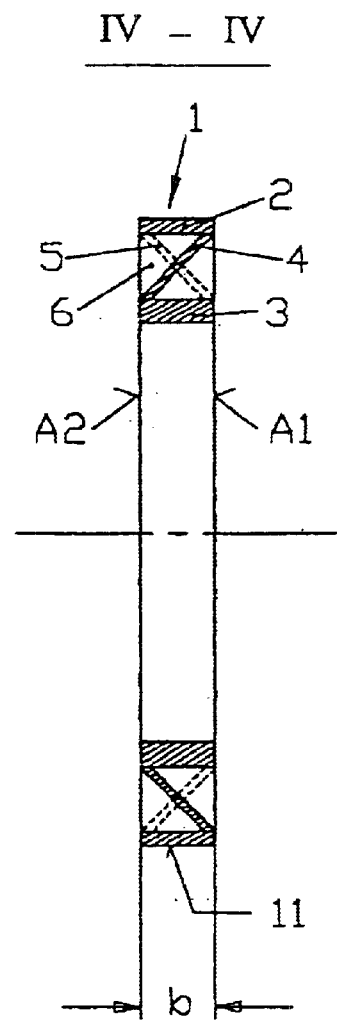
Fig. 4
Fig. 4a

HUB FOR INFORMATION MEDIA IN STRIP OR TAPE FORM

CROSS-REFERENCE TO RELATED APPLICATIONS

The present application claims priority under 35 U.S.C. §119 of German Patent Application No. 200 21 553.1, filed Dec. 20, 2000, the disclosure of which is expressly incorporated by reference herein in its entirety.

BACKGROUND OF THE INVENTION

1. Field of the Invention

The invention relates to a hub for information media in strip or tape form, the hub substantially comprising an outer ring and an inner ring, which generally has three driving grooves for transferring rotational movement of a tensioning shaft to the hub. The width of the winding area of the outer ring corresponds at least to the width of the information medium, and the outer ring and inner ring are connected by radially running webs or ribs.

2. Description of Background Information

The different requirements which the hub has to meet when the tape is being wound up and spooled into cassettes or cartridges, or when carrying out duplicating processes, are taken into account by different hub designs. For example, cores with the greatest possible dimensional stability are required for duplication by the process known as a TMD (Thermo Magnetic Duplication) process. However, owing to high material expenditure and high costs, and also for reasons of weight, a hub of this type should otherwise be avoided as far as possible.

A thermoplastic material, with or without reinforcing materials such as glass fibers or glass beads, is generally used as the material.

In their basic form, all hubs currently on the market comprise an outer ring and an inner ring, the two rings being connected by means of a central web running around radially and attached at the geometrical center of the width of the outer ring, so that a double-T profile is produced. For further stiffening of this profile, it is known additionally to attach ribs extending from the outer ring to the inner ring at certain divisional intervals on both sides of the central web running around radially.

A core of this design satisfies requirements only if the information medium in strip or tape form to be wound onto it has an exactly constant thickness over its width. Due to unavoidable production tolerances in the manufacture of the base film and during coating with magnetic dispersion, an information medium in strip or tape form cannot be manufactured with an exactly constant thickness over its width. This has the consequence that, during the winding operation, the pressure loading of the tape bearing surface of the hub varies over its width. In the worst case, thick points in the information medium in strip or tape form that coincide in their position, lying one on top of the other, cause such high forces on one side of the tape bearing surface during winding onto the hub that the hub twists and the tape bearing surface tilts away to one side and, as a result, a dish-shaped roll is produced. Asymmetrical pressure loading of the hub also occurs if the tape roll on the hub is slightly offset laterally. In the case of dish-shaped tape rolls, the information medium in strip or tape form is stretched on one side, resulting in tape running disturbances in the recording and reproducing equipment and intolerable signal distortions.

SUMMARY OF THE INVENTION

On the basis of the aforementioned drawbacks of the prior art, the invention resides in providing a hub of the generic type described above, which does not suffer from the disadvantages of the prior art and, comprises plastic and, for recycling reasons, functions as far as possible without reinforcing additives such as glass fibers or glass beads, in order to avoid a dish-shaped roll when information media in strip or tape form are wound onto the hub.

The hub according to the present invention, may be made of thermoplastic material with or without filler material (e.g. glass fiber). Some examples of suitable material for the hub are polystyrene, ABS (acrylonitrile/butadiene/styrene copolymers), a mixture of polybutylene terephthalate with polycarbonate, PVC (polyvinyl chloride) and polyamide.

According to an aspect of the invention, a hub for an information medium comprises an outer winding area having a width, a central bore and a center point located on the hub, driving grooves on a circumference of the hub, an outer ring, an inner ring, and a connector for connecting the outer ring with the inner ring. The width of the outer winding area of the hub is at least equal to a width of the information medium. The connector comprises diagonal ribs running diagonally at a slant in an axial direction and sloping alternately in accordance with two axial directions of the hub and in neighboring segments. Respective pairs of neighboring diagonal ribs are sloped in different directions and have a further rib between them.

According to another aspect of the invention, the medium comprises a strip or tape form. The width of the outer winding area of the hub may be greater than a width of the information medium.

According to yet another aspect of the invention, a first of the diagonal ribs extends from an end face of the outer ring to an end face of the inner ring. A second of the diagonal ribs extends from an end face of the inner ring to an end face of the outer ring. A further rib may be arranged between the first rib and the second rib.

Moreover, according to the invention, the outer ring and the inner ring are spaced apart by a given distance, and the degree of slant and the degree of sloping of the ribs are selected depending on the width of the outer winding area of the hub and the distance between the outer ring and the inner ring.

The hub may be made of a thermoplastic material with or without filler material, wherein the filler material comprises glass fiber. The hub may be made of one of polystyrene, ABS (acrylonitrile/butadiene/styrene copolymers), a mixture of polybutylene terephthalate with polycarbonate, PVC (polyvinyl chloride), or polyamide.

According to another aspect of the invention, a hub for an information medium comprises one of, strip or tape form, the hub comprising an outer winding area having a width, a central bore and a center point located on the hub, driving grooves on a circumference of the hub, an outer ring, an inner ring and a connector for connecting the outer ring with the inner ring. The width of the outer winding area of the hub is at least equal to a width of the information medium. The connector comprises diagonal ribs running diagonally at a slant in an axial direction and sloping alternately in accordance with two axial directions of the hub and in neighboring segments, wherein respective pairs of neighboring diagonal ribs are sloped in different directions and have a further rib between them. A first of the diagonal ribs extends from an end face of the outer ring to an end face of the inner ring, a second of said diagonal ribs extends from an end face of the inner ring to an end face of the outer ring, and the further rib is arranged between the first rib and the second rib. The outer ring and the inner ring are spaced apart by a given distance, the degree of slant and the degree of sloping of the ribs being selected depending on the width of the outer winding area of the hub and the distance between the outer ring and the inner ring.

A hub according to the invention is more particularly described below. Further details emerge from the description and the drawings.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting exemplary embodiments of the present invention, in which like reference numerals represent similar parts throughout the several views of the drawings, and wherein:

FIG. 1 shows a schematic representation of a properly formed planar roll;

FIG. 2 shows a schematic representation of a dish-shaped roll;

FIG. 3 shows a conventional hub with a double-T profile and stiffening ribs;

FIG. 3a shows a partial section III through a conventional hub with a double-T profile and stiffening ribs;

FIG. 4 shows a torsionally resistant hub according to the invention; and

FIG. 4a shows a section IV through a hub according to FIG. 4.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As previously mentioned, the hub (1) substantially comprises two interconnected concentric rings, an outer ring (2) and an inner ring (3). Furthermore, the hub has a central bore (12) and, on its inner circumference, driving grooves (13). The width (b) of the winding area (11) of the outer ring (2) corresponds at least to the width of the information medium to be wound up.

As can be seen from FIG. 3 and FIG. 3a, the hub can be divided into a number of segments by the webs running radially between the outer ring and inner ring, the torsional rigidity of the hub depending significantly on the shaping of the individual segments. Investigations have shown that it is particularly advantageous if the respectively following segment is shaped in such a way that its elements counteract the deformation of the preceding segment caused by twisting and if the number of segments is as great as possible.

A design according to the invention of a torsionally rigid hub is provided by a hub (1) for information media in strip or tape form in which the width (b) of the outer winding area (11) of the hub corresponds at least to the width of the information medium and the hub has a central bore (12) and, on its inner circumference, driving grooves (13), and is provided with an outer ring (2) and an inner ring (3), which are interconnected, and the connection between the outer ring (2) and the inner ring (3) of the hub (1) is formed by ribs (4, 5, 6), the ribs (4, 5) running diagonally at a slant in the axial direction and sloping alternately in accordance with the two axial directions of the hub (1) and in the neighboring segments, and respective pairs of neighboring diagonal ribs (4, 5), sloping in different directions, having a further rib (6) between them.

A particularly preferred configuration of the invention is represented in FIG. 4 and FIG. 4a. As is clearly evident, all the ribs (4) run diagonally from the end face A1 of the outer ring (2) to the end face A2 of the inner ring (3), while all the ribs (5) run diagonally from the end face A2 of the outer ring (2) to the end face A1 of the inner ring (3). The ribs (6) also end flush with the end faces A1 and A2.

The design shown here is not restricted to the normal hub, but can also be applied advantageously to stackable hubs, as described by way of example in DE 94 00 220 U1, the disclosure of which is expressly incorporated by reference herein in its entirety.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

List of Reference Characters 1 hub
2 outer ring
3 inner ring
4–6 ribs
11 winding area
12 central bore
13 driving grooves
A1 end face
A2 end face
b width

What is claimed is:

1. A hub for an information medium, the hub comprising:
   an outer winding area having a width;
   a central bore and a center point located on the hub;
   driving grooves on a circumference of the hub;
   an outer ring;
   an inner ring;
   a connector for connecting the outer ring with the inner ring;

the width of the outer winding area of the hub being at least equal to a width of the information medium;

said connector comprising diagonal ribs running diagonally at a slant in an axial direction and sloping alternately in accordance with two axial directions of the hub and in neighboring segments, wherein respective pairs of neighboring diagonal ribs are sloped in different directions and have a further rib between them.

2. The hub for an information medium according to claim 1, wherein said medium comprises a strip or tape form.

3. The hub for an information medium according to claim 2, wherein the width of the outer winding area of the hub is greater than a width of the information medium.

4. The hub for an information medium according to claim 1, wherein the width of the outer winding area of the hub is greater than a width of the information medium.

5. The hub for an information medium according to claim 1, wherein a first of said diagonal ribs extends from an end face of the outer ring to an end face of the inner ring.

6. The hub for an information medium according to claim 5, wherein a second of said diagonal ribs extends from an end face of the inner ring to an end face of the outer ring.

7. The hub for an information medium according to claim 6, wherein said further rib is arranged between said first rib and said second rib.

8. The hub for an information medium according to claim 1, wherein the outer ring and the inner ring are spaced apart by a given distance, and wherein the degree of said slant and the degree of sloping of the ribs are selected depending on the width of the outer winding area of the hub and said distance between the outer ring and the inner ring.

9. The hub for an information medium according to claim 1, wherein the hub is made of one of, a thermoplastic material with filler material and a thermoplastic material without filler material.

10. The hub for an information medium according to claim 9, wherein the filler material comprises glass fiber.

11. The hub for an information medium according to claim 1, wherein the hub is made of polystyrene.

12. The hub for an information medium according to claim 1, wherein the hub is made of acrylonitrile/butadiene/styrene copolymers (ABS).

13. The hub for an information medium according to claim 1, wherein the hub is made of a mixture of polybutylene terephthalate with polycarbonate.

14. The hub for an information medium according to claim 1, wherein the hub is made of polyvinyl chloride (PVC).

15. The hub for an information medium according to claim 1, wherein the hub is made of polyamide.

16. A hub for an information medium comprising one of, strip or tape form, the hub comprising:

an outer winding area having a width;
a central bore and a center point located on the hub;
driving grooves on a circumference of the hub;
an outer ring;
an inner ring;
a connector for connecting the outer ring with the inner ring;
the width of the outer winding area of the hub being at least equal to a width of the information medium;
said connector comprising diagonal ribs running diagonally at a slant in an axial direction and sloping alternately in accordance with two axial directions of the hub and in neighboring segments, wherein respective pairs of neighboring diagonal ribs are sloped in different directions and have a further rib between them, a first of said diagonal ribs extending from an end face of the outer ring to an end face of the inner ring, a second of said diagonal ribs extending from an end face of the inner ring to an end face of the outer ring, and said further rib being arranged between said first rib and said second rib; and the outer ring and the inner ring being spaced apart by a given distance, the degree of said slant and the degree of sloping of the ribs being selected depending on the width of the outer winding area of the hub and said distance between the outer ring and the inner ring.

17. The hub for an information medium according to claim 16, wherein the hub is made of one of, polystyrene, acrylonitrile/butadiene/styrene copolymers (ABS), a mixture of polybutylene terephthalate with polycarbonate, and polyamide, and one of, a thermoplastic material with filler material and a thermoplastic material without filler material.

* * * * *